Jan. 31, 1928.
J. O. CARREY
1,657,741
DISK VALVE
Filed Dec. 12, 1924        2 Sheets-Sheet 2
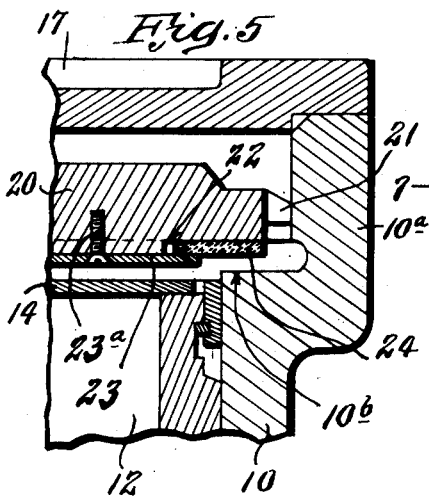
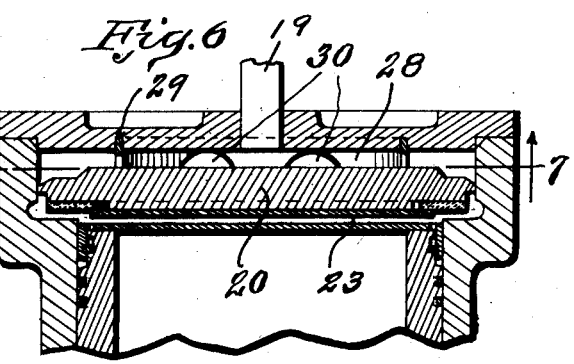
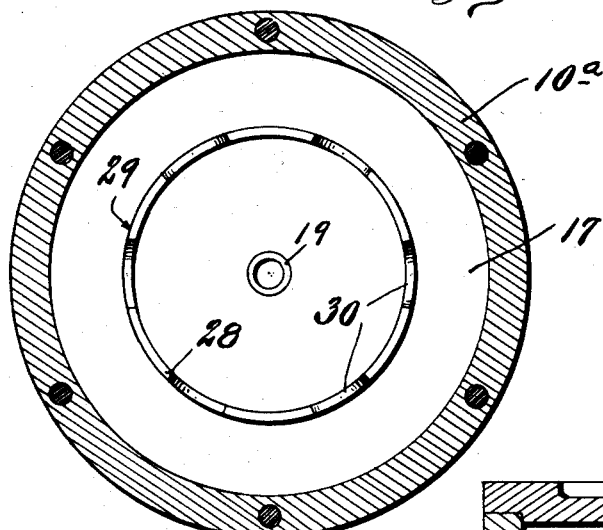
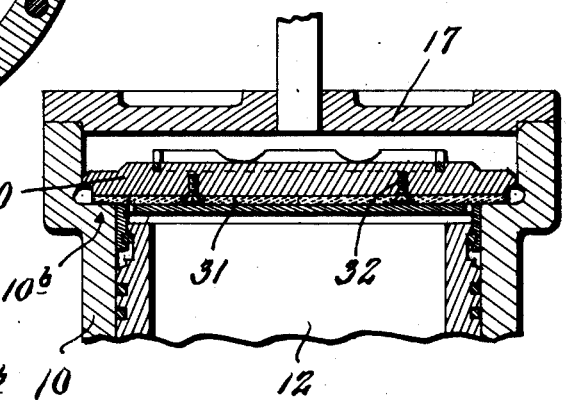
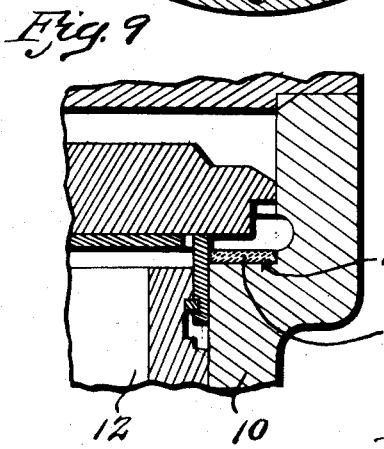
Inventor
John O. Carrey
By Cornwall, Bidell & James
Att'ys.

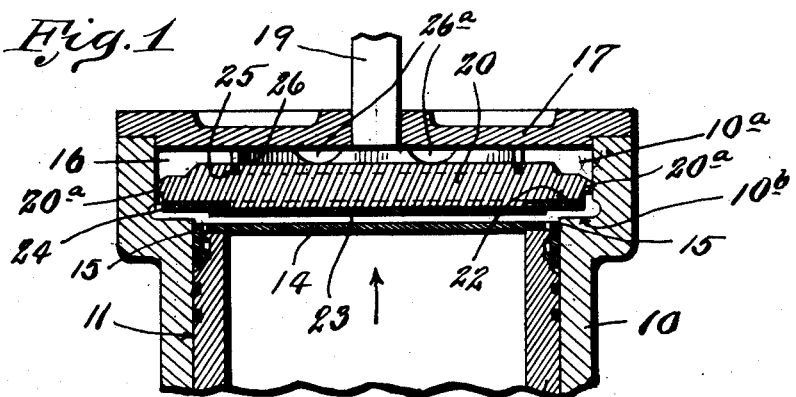
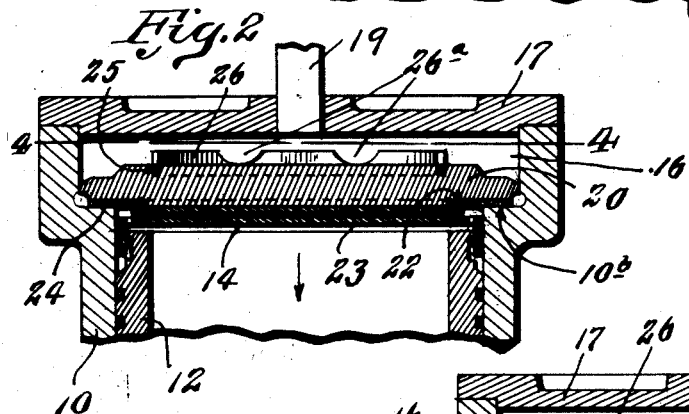
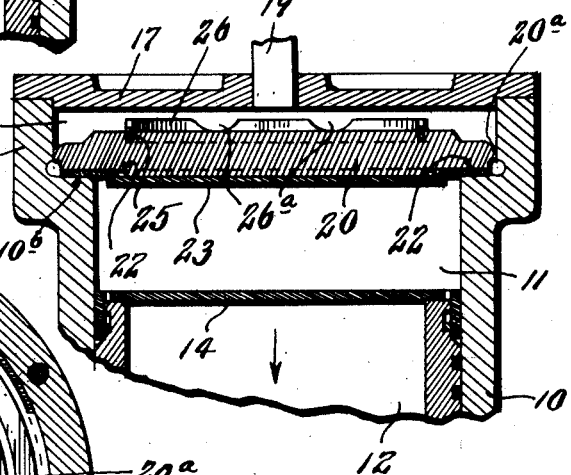
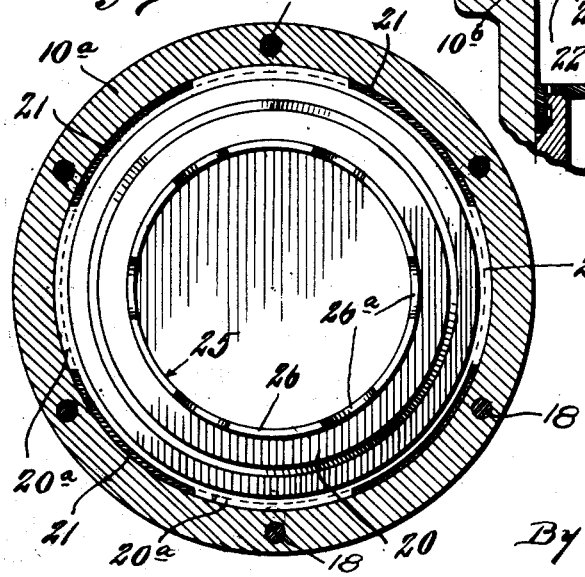

Patented Jan. 31, 1928.

1,657,741

UNITED STATES PATENT OFFICE.

JOHN O. CARREY, OF ST. LOUIS, MISSOURI, ASSIGNOR TO CARREY-MORSE ENGINEERING COMPANY, OF ST. LOUIS, MISSOURI, A CORPORATION OF MISSOURI.

DISK VALVE.

Application filed December 12, 1924. Serial No. 755,573.

This invention relates to new and useful improvements in displaceable disk valves for compressors and the like, and the objects of the invention are to provide a valve for controlling the discharge end of the compression chamber and which is automatically operated to open and close the communication between the high pressure chamber and the compression chamber of said compressor.

Further objects of the invention are to provide a disk valve having arranged in its annular edge and one of its faces a plurality of recesses or passageways whereby when said disk valve is displaced the compressed fluid can, by means of said passageways, pass freely from the compression chamber to the pressure chamber and hence to the discharge connection leading from the latter.

Still further objects of the invention are to provide the opposed faces of said valve with non-metallic inserts or facings, preferably made of fiber, which are designed to alternately engage the respective walls of the pressure chamber and prevent the contacting of the valve itself with said walls, thereby producing noiseless operation of the valve.

With these and other objects in view, my invention consists in certain novel features of construction and arrangement of parts, hereinafter more fully described and claimed, and illustrated in the accompanying drawings, in which—

Figure 1 is a vertical cross section taken longitudinally through the upper end of the compressor cylinder and showing the piston thereof in its extreme upward position and showing the disk valve in displaced position.

Figure 2 is a similar view showing the piston at the beginning of its downward movement and showing the disk valve seated against the compression chamber and closing the communication between the latter and the pressure chamber.

Figure 3 is a similar view showing the piston moving upwardly and showing the disk valve in readiness to be displaced by the pressure in the compression chamber.

Figure 4 is a horizontal cross section taken on lines 4—4 of Figure 2.

Figure 5 is an enlarged cross section taken on lines 5—5 of Figure 4.

Figure 6 is a vertical cross section taken longitudinally of the discharge end of the machine and showing a modified construction of the valve.

Figure 7 is a horizontal cross section taken on lines 7—7 of Figure 6 looking in the direction indicated by arrows.

Figure 8 is a further modified form of the valve.

Figure 9 is an enlarged fragmental cross section showing the valve seat equipped with a non-metallic lining.

The present invention is an improvement on the construction shown in my copending application filed October 24, 1924, Serial No. 745,655.

Referring by numerals to the accompanying drawings, 10 indicates a cylinder of a compressor or other fluid machine, having a compression chamber 11 in which operates a piston 12. This piston is provided with a head or cap 14 which is provided in its end wall with a series of apertures 15 and which is displaceable during the downward or intake stroke of the piston, whereby the compressible fluid can pass from the interior of the piston through said apertures into the compression chamber 11. The upper end of cylinder 10 is enlarged as indicated at 10ª to form an annular seat 10ᵇ and a pressure chamber 16. A plate 17 is secured to the enlarged end 10ª in any suitable manner and closes the compression chamber 15. Leading from plate 17 is a discharge connection 19 through which the compressed fluid is conveyed away from the pressure chamber.

Operating in the pressure chamber 16 is a disk valve 20, the diameter of which is less than the inner diameter of said pressure chamber 16, thereby providing annularly disposed spaces or recesses 21 which permit the fluid to pass freely around said valve. Formed integral with and projecting from the annular edge of the valve or disk 20 is a series of radially disposed lugs 20ª which slidably bear against the inner wall of enlarged head 10ª and serve to maintain said valve in proper spaced relation in said chamber and prevent loose play of said disk valve in chamber 16. The lower face of disk 20 is provided with an annular seat 22 for the reception of a fiber washer 24 which, when said valve occupies closed position, seats itself on seat 10$^b$ and seals the communication between the compression chamber 11 and pressure chamber 16. Furthermore, the provision of a non-metallic insert in that portion of valve 20 which engages the metallic seat 10$^b$ eliminates noises and knocking during the operation of said valve.

Washer 24 is removable and can be replaced when worn out or defective, thereby eliminating expensive machine operations on the valve. The upper face of disk valve 20 is formed with a circular groove 25 in which is adapted to be seated a ring 26, the upper or projecting portion of which is provided with a series of notches or scallops 26$^a$, which, when said valve occupies displaced or upward position, as shown in Figure 1, allow the compressed fluid to pass from the pressure chamber 16 to the discharge connection 19. At the same time ring 26, being made of fiber, serves as a cushion and provides for noiseless operation of the valve. In order to provide for contraction of ring 26 without danger of buckling or warping, said ring is of less width than the width of seat 22, thereby permitting said ring a certain degree of free movement and assuring accurate seating of said ring. The ring is held in place by a retainer plate 23 secured to the underside of valve 20 by screws 23$^a$ and having its annular edge overlapping the inner edge of said ring.

In the modified form shown in Figures 6 and 7 a fiber ring 28 is seated in a groove 29 formed in the underside of cylinder and plate and extends downwardly therefrom toward valve 20. Thus when the valve is moved upward, it is held spaced from cylinder plate 17 so that the fluid can pass from the pressure chamber 16 to the discharge connection 19. The ring 28 is provided with openings or notches 30 for permitting free passage of fluid therethrough.

In the form shown in Figure 8, instead of furnishing the underface of valve 20 with a fiber or non-metallic washer, the entire face is provided with non-metallic facing 31 which is secured in position in any suitable manner, such as screws 32.

The modified form shown in Figure 9 discloses a non-metallic member 34 arranged on the annular edge 10$^b$ of the cylinder 10 and serving as a seat for valve 20.

A valve of my improved construction is simple in construction and operation, is not dependent on spring action to seat itself and the provision of non-metallic members prevents contacting of the metal surfaces of the valve with the walls of the housing or chamber, thereby eliminating noise and prolonging the life of the valve.

It is obvious that minor changes in the construction of my improved valve can be made and substituted for those herein disclosed, without departing from the spirit of my invention.

I claim:

1. A disk valve for compressors provided in its upper face with a circular groove and a ring of non-metallic material seated in said groove and provided in its projecting edge with a series of notches.

2. A disk valve of the class described provided in its upper face with a circular groove, a ring of non-metallic material seated in said groove and provided in its projecting edge with a series of notches, and a non-metallic washer arranged in an annular seat formed in the underside of said disk and adapted to engage the valve seat.

3. A disk valve provided in its upper face with upwardly presented non-metallic spacing projections, and a non-metallic washer arranged in an annular seat formed in the underside of said disk and adapted to form a seal for said valve.

4. In a valve construction, the combination with a valve housing having a discharge opening at one end and an annular valve seat at the opposite end, of a circular valve freely arranged in said chamber and provided with a non-metallic facing adapted when said valve is in one position to rest on said annular seat, thereby sealing access to said chamber, said valve being provided on its opposite face with non-metallic projections for spacing said valve from said discharge opening for permitting discharge of fluid therethrough.

5. In a valve construction, the combination with a valve housing, of a circular valve loosely arranged in said housing for controlling the admission of fluid thereto, said housing being provided with a seat for receiving said valve, a non-metallic circular member interposed between said valve and said seat for establishing fluid-tight seal therebetween and preventing contacting of the metallic parts thereof, and non-metallic spacers interposed between said valve and the discharge end of said housing for spacing said valve from the discharge outlet of said chamber.

6. In a valve construction, the combination with a valve housing, of a disk valve arranged for axial movement therein, and a non-metallic spacing ring arranged between said valve and said housing and carried by one of said elements and adapted to engage the other, thereby preventing the contacting of the metal surfaces of said elements and eliminating noise produced thereby, said ring having portions of its projecting edge cut away to provide for passage between said elements.

In testimony whereof I hereunto affix my signature this 4th day of December, 1924.

JOHN O. CARREY.